United States Patent
Rock

(10) Patent No.: US 7,045,245 B2
(45) Date of Patent: May 16, 2006

(54) METHOD AND APPARATUS FOR PROVIDING A UNIFORM FUEL CELL STACK STRUCTURE

(75) Inventor: Jeffrey A Rock, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 493 days.

(21) Appl. No.: 10/136,975

(22) Filed: Apr. 30, 2002

(65) Prior Publication Data
US 2003/0203269 A1 Oct. 30, 2003

(51) Int. Cl.
*H01M 8/04* (2006.01)

(52) U.S. Cl. .......................... 429/37; 429/34
(58) Field of Classification Search .......... 429/40–44, 429/37
See application file for complete search history.

(56) References Cited

U.S. PATENT DOCUMENTS

| | | | | |
|---|---|---|---|---|
| 4,692,391 A | * | 9/1987 | Hirota | 429/34 |
| 4,997,728 A | * | 3/1991 | Onoda et al. | 429/34 |
| 5,176,966 A | | 1/1993 | Epp et al. | |
| 5,484,666 A | | 1/1996 | Gibb et al. | |
| 5,547,777 A | * | 8/1996 | Richards | 429/32 |
| 5,789,091 A | | 8/1998 | Wozniczka et al. | |
| 5,993,987 A | * | 11/1999 | Wozniczka et al. | 429/37 |
| 6,040,072 A | | 3/2000 | Murphy et al. | |
| 6,200,698 B1 | * | 3/2001 | Carlstrom, Jr. | 429/34 |
| 6,218,039 B1 | * | 4/2001 | Mease et al. | 429/37 |
| 6,645,659 B1 | * | 11/2003 | Bisaka et al. | 429/37 |
| 6,797,425 B1 | * | 9/2004 | Blanchet | 429/37 |

FOREIGN PATENT DOCUMENTS

| | | |
|---|---|---|
| CA | 2 353 210 A1 | 1/2002 |
| EP | 0 444 383 A1 | 9/1991 |
| EP | 0 860 834 A2 | 8/1998 |
| EP | 0 981 174 A2 | 2/2000 |
| EP | 0 981 175 A2 | 2/2000 |
| JP | 62-271364 | 11/1987 |
| JP | 08-055631 | 2/1996 |
| JP | 08088018 | 4/1996 |

* cited by examiner

*Primary Examiner*—Mark Ruthkosky
(74) *Attorney, Agent, or Firm*—Harness, Dickey & Pierce, P.L.C.

(57) ABSTRACT

An electro-chemical fuel cell stack has a plurality of fuel cells arranged in a stacked configuration to form a fuel cell assembly. The fuel cell assembly is interposed between at least one spacer plate and first and second end plates. The first and second end plates are held in a fixed spaced relation so that the first and second end plates impart a compressive force on the fuel cell assembly. The spacer plates can be used to provide a fuel cell stack of a predetermined length. The fuel cell stack can be made by compressing the fuel cell stack with a predetermined compressive load or by compressing the fuel cell stack a predetermined distance and then securing the first and second end plates in a fixed spaced relation.

12 Claims, 9 Drawing Sheets

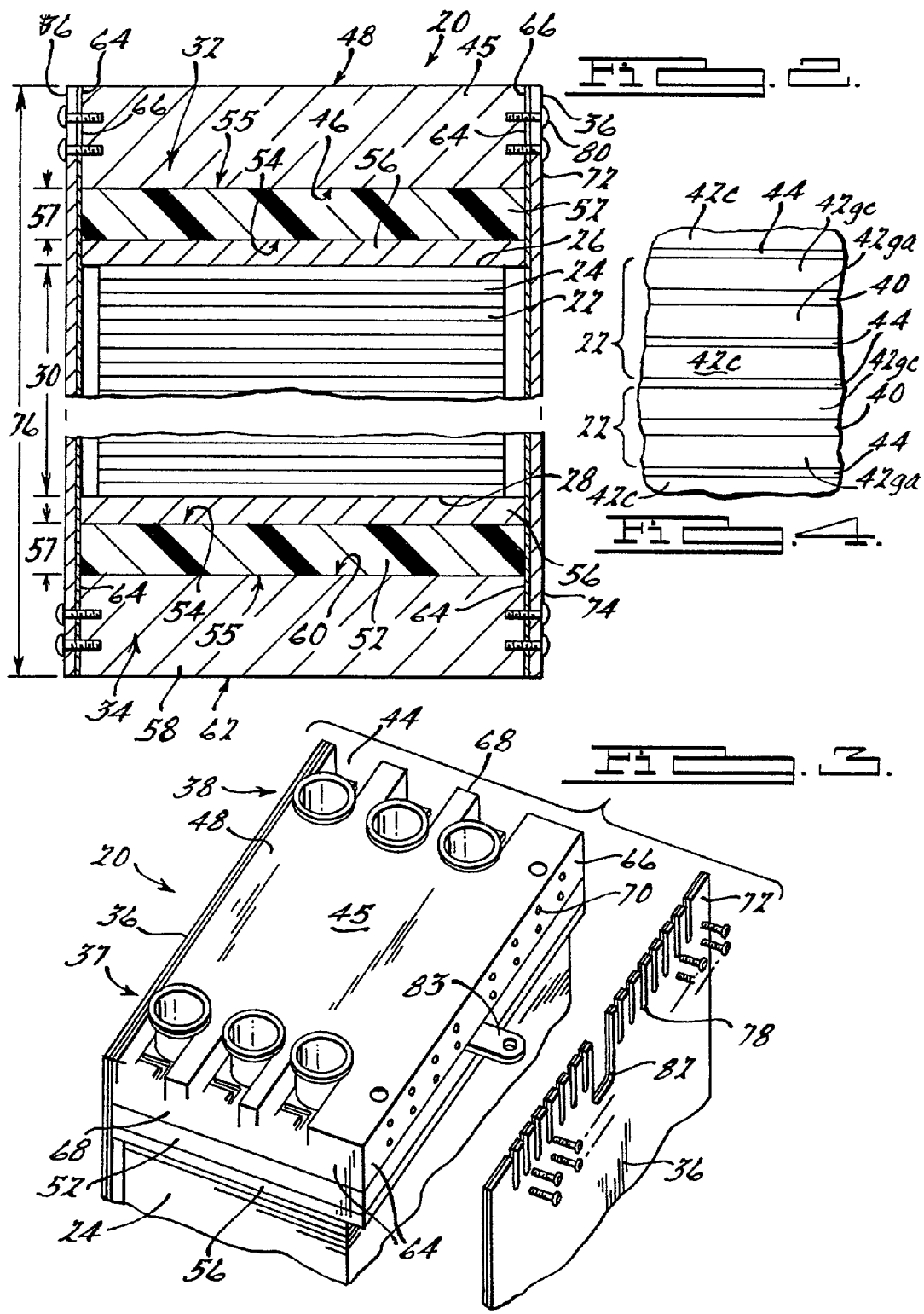

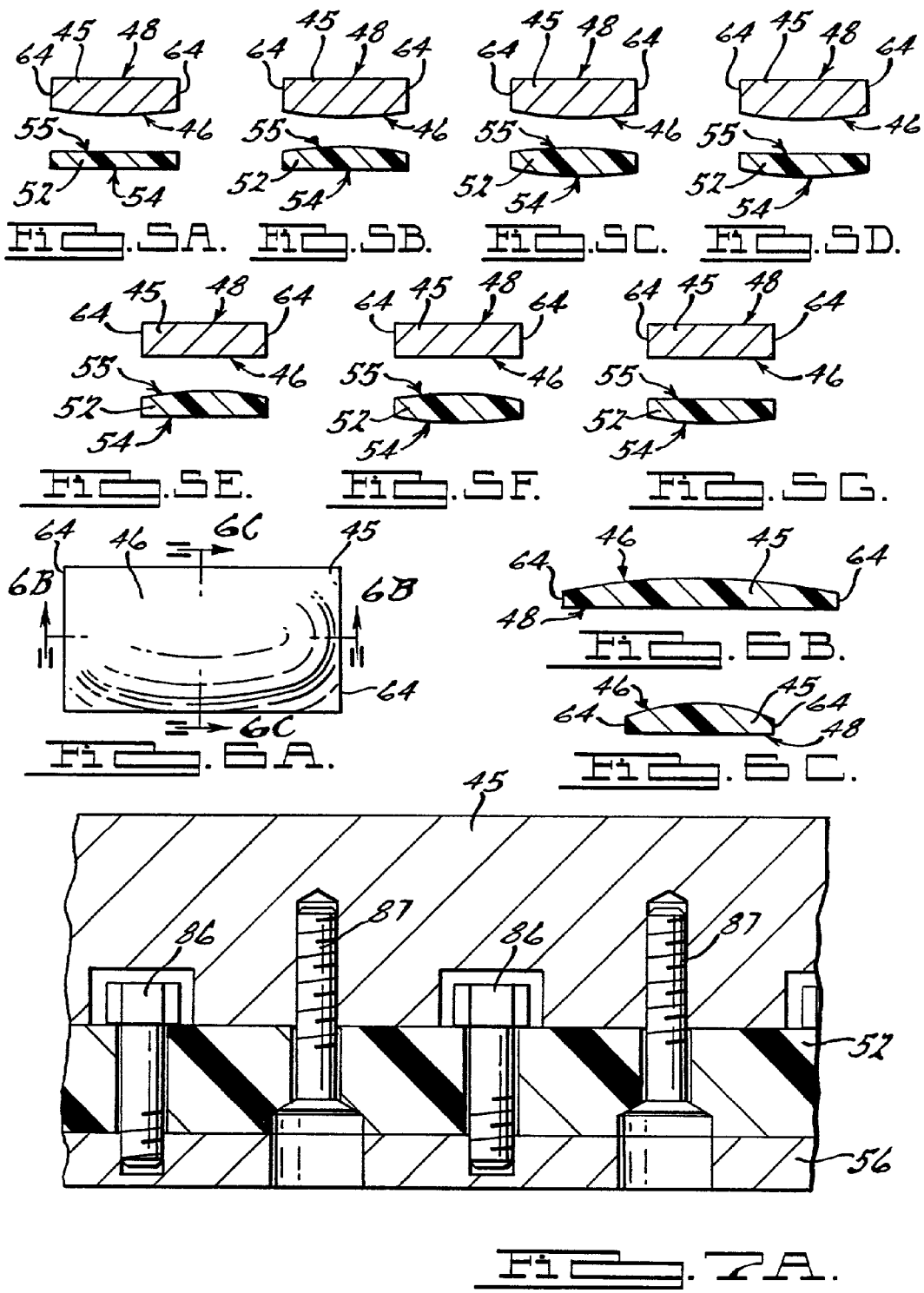

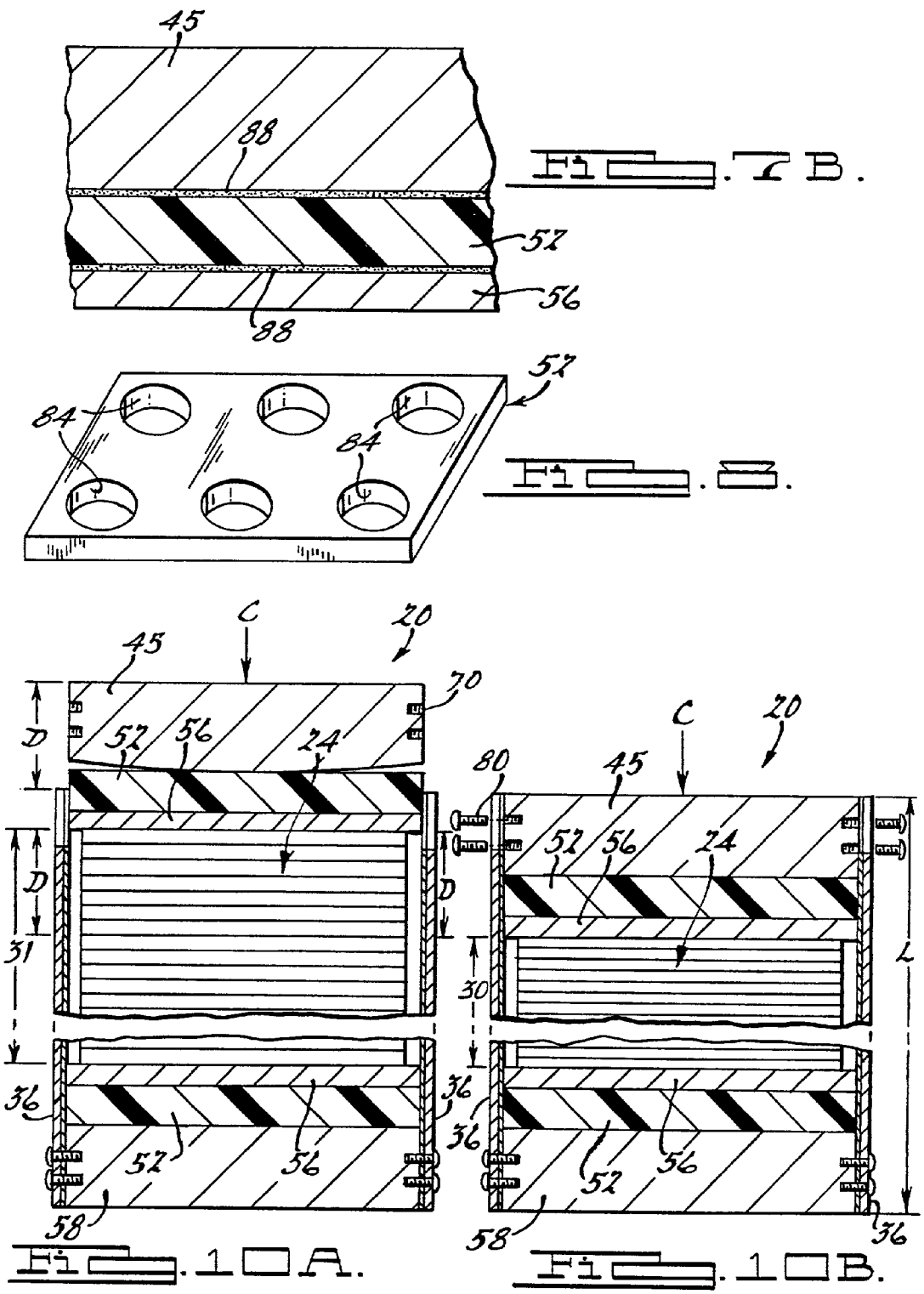

METHOD AND APPARATUS FOR PROVIDING A UNIFORM FUEL CELL STACK STRUCTURE

FIELD OF THE INVENTION

The present invention relates to fuel cells and, more particularly, to fuel cells arranged in a stack and held in compression.

BACKGROUND OF THE INVENTION

Fuel cell stacks typically comprise a plurality of fuel cells stacked one upon the other and held in compression with respect to each other. The plurality of stacked fuel cells form a fuel cell assembly which is compressed to hold the plurality of fuel cells in a compressive relation. Typically, each fuel cell comprises an anode layer, a cathode layer, and an electrolyte interposed between the anode layer and the cathode layer. The fuel cell assembly requires a significant amount of compressive force to squeeze the fuel cells of the stack together. The need for the compressive force comes about from the internal gas pressure of the reactants within the fuel cells plus the need to maintain good electrical contact between the internal components of the cells. Generally, the per area unit force is about 195–205 psi total which is distributed evenly over the entire active area of the cell (typically 77–155 square inches for automotive size stacks). Thus, for a fuel cell with an area of about 80 square inches, the typical total compressive force of these size stacks is about 15,500 to 16,500 pounds.

Typical prior art fuel cell stack structures have focused on the use of rigid end plates and tie rods to apply and maintain a compressive force on the fuel cell assembly. The fuel cell assembly to be compressed is interposed between a pair of rigid end plates. The end plates are then compressed together by tie rods that extend through the end plates and impart a compressive force on the end plates. This structure and other similar structures typically used, resulted in fuel cell stack structures of varying lengths in order to achieve the desired compression of the fuel cell assembly. Additionally, the electrolyte membrane that has been used in fuel cells was approximately 0.007 inches thick and would slip or stress relax over time thus requiring the fuel cell stack structure to be further compressed in order to maintain a desired compressive force on the fuel cell assembly.

Today's current fuel cell assemblies utilize a membrane that is 0.018 microns thick and is reinforced. As a result the slip or stress relaxation is much lower and is not as big a concern as in prior art fuel cell assemblies. Therefore, the fuel cell assemblies using the new, thinner and reinforced membrane are not required to be further compressed after a period of time to account for relaxation or stress relief of the membrane.

Fuel cell stack structures can be utilized in a variety of applications. Because the space in which the fuel cell stack structures are typically employed have a fixed volume, such as in an automobile or bus, it would be desirable if the fuel cell stack structures were of a uniform size so that different fuel cell stack structures could be interchanged.

Therefore, it would be desirable to provide fuel cell stack structures that are of a uniform length. Furthermore, it would be desirable to build and provide a fuel cell stack structure of uniform length regardless of the number of fuel cells that comprise the fuel cell assembly while still imparting a desired compressive loading on the active area of the fuel cell assembly.

Because the current fuel cell stack structures utilize thin and reinforced membranes that exhibit substantially less dimensional slip and stress relaxation, other compressive loading approaches are now feasible for the fuel cell stack structures. These compressive loading techniques enable the fuel cell stack structure to be of a uniform size. Furthermore, because the characteristics of the fuel cell assembly and the reinforced membranes are better understood, the distance that a fuel cell assembly needs to be compressed to obtain a given compressive loading on the active area of the fuel cell assembly can be determined by the number of fuel cells that comprise the fuel cell assembly. This enables the use of a fixed distance of compression when assembling a fuel cell stack structure as opposed to prior art use of compressing a fuel cell stack structure until a predetermined compressive load is applied to the active area.

SUMMARY OF THE INVENTION

The present invention is directed to an apparatus and method for providing a uniform fuel cell stack structure. Additionally, the present invention is directed to method of compressing a fuel cell assembly by a fixed distance as compared with a fixed load.

An electrochemical fuel cell stack of the present invention comprises a plurality of fuel cells arranged in a stacked configuration to form a fuel cell assembly. The fuel cell assembly has opposite first and second ends and a length therebetween. First and second end plates are disposed adjacent the respective first and second ends of the fuel cell assembly. The first and second end plates are held in a fixed spaced relation of a predetermined distance so that the first and second end plates impart a compressive force on the fuel cell assembly along the length. At least one spacer plate is interposed between the first end plate and the first end of the fuel cell assembly. The at least one spacer plate is dimensioned so that the compressive force imparted on the fuel cell assembly by the first and second end plates is of a predetermined magnitude.

A method of making an electrochemical fuel cell stack of a predetermined length of the present invention includes the steps of: 1) choosing a predetermined length for a fuel cell stack having a fuel cell assembly; 2) compressing the fuel cell assembly with a predetermined compressive load; 3) determining a compressed length of the compressed fuel cell assembly; 4) calculating a difference between a length of space available for the compressed fuel cell assembly in the fuel cell stack and the compressed length of the compressed fuel cell assembly; 5) removing the predetermined compressive load from the fuel cell assembly; 6) positioning at least one spacer plate having a thickness generally equal to the calculated difference in the fuel cell stack; 7) applying a compressive load to the fuel cell stack so that the fuel cell stack is compressed to the predetermined length; 8) securing first and second end plates of the fuel cell stack in a fixed spaced relation to retain the fuel cell stack generally at the predetermined length, thereby imparting a compressive force on the fuel cell assembly after the applied compressive load on the fuel cell stack is removed; and 9) removing the applied compressive load from the fuel cell stack. The above method provides a fuel cell stack of a predetermined fixed length while maintaining a desired compressive loading on the active area of the fuel cell assembly.

In another aspect of the present invention, steps 2, 3 and 4 of the above-described method are modified to provide a different method of making an electrochemical fuel cell stack of a predetermined length. The steps are modified to include the steps of: 2) compressing the fuel cell stack with a predetermined compressive load; 3) determining a length of the compressed fuel cell stack; and 4) calculating a difference between the predetermined length and the determined length of the compressed fuel cell stack.

The principles of the present invention also provide for a method of making an electro-chemical fuel cell stack by compressing the fuel cell assembly and/or fuel cell stack a predetermined distance. The method comprises the steps of: 1) determining a predetermined distance to compress a fuel cell stack having a fuel cell assembly; 2) applying a compressive load to the fuel cell stack so that the fuel cell stack is compressed the predetermined distance; 3) securing first and second end plates of the fuel cell stack in a fixed spaced relation so that the first and second end plates retain the fuel cell stack compressed to the predetermined distance, thereby imparting a compressive force on the fuel cell assembly after the compressive load is removed; and 4) removing the compressive load from the fuel cell stack.

In another aspect of the present invention, a method of making an electro-chemical fuel cell stack of a predetermined length is disclosed. The method comprises the steps of: 1) choosing a predetermined length for a fuel cell stack having a fuel cell assembly; 2) determining a predetermined distance to compress a fuel cell stack having a fuel cell assembly to impart a compressive force of a predetermined magnitude on the fuel cell assembly; 3) calculating a spacer plate thickness as a function of said predetermined length and said predetermined distance; 4) positioning at least one spacer plate having said spacer plate thickness in the fuel cell stack; 5) applying a compressive load to the fuel cell stack so that the fuel cell stack is compressed to generally the predetermined length; 6) securing first and second end plates of the fuel cell stack in a fixed spaced relation so that the first and second end plates retain the fuel cell stack compressed to the predetermined length, thereby imparting a compressive force of the generally known magnitude on the fuel cell assembly after the compressive load is removed; and 7) removing the compressive load from the fuel cell stack.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a simplified cross-sectional view of the electro-chemical fuel cell stack of FIG. 1 taken along line 2—2;

FIG. 3 is a partial exploded perspective view of the electro-chemical fuel cell stack of FIG. 1 showing the attachment of a side plate to the electro-chemical fuel cell stack;

FIG. 4 is a simplified fragmentary view showing details of a fuel cell;

FIGS. 5A–G are cross-sectional views of various configurations for the end plate and spacer plate of the electro-chemical fuel cell stack of the present invention;

FIG. 6A is a plan view of a contoured inner surface of an end plate according to the principles of the present invention;

FIG. 6B is a cross-sectional view of the end plate of FIG. 6A taken along line B—B;

FIG. 6C is a cross-sectional view of the end plate of FIG. 6A taken along line C—C;

FIGS. 7A–B are fragmentary cross-sectional views of an end assembly of an electro-chemical fuel cell stack of the present invention showing various ways of attaching the components of the end assemblies;

FIG. 8 is a perspective view of a spacer plate used in an electro-chemical fuel cell stack of the present invention showing the use of holes to decrease the weight of the spacer plate;

FIGS. 10A–B are simplified cross-sectional views of the electro-chemical fuel cell stack of FIG. 1 illustrating the compressing of the fuel cell assembly and fuel cell stack a predetermined distance D;

DETAILED DESCRIPTION OF THE PREFERRED EMBODIMENTS

The following description of the preferred embodiment(s) is merely exemplary in nature and is in no way intended to limit the invention, its application, or uses.

Figure 1:
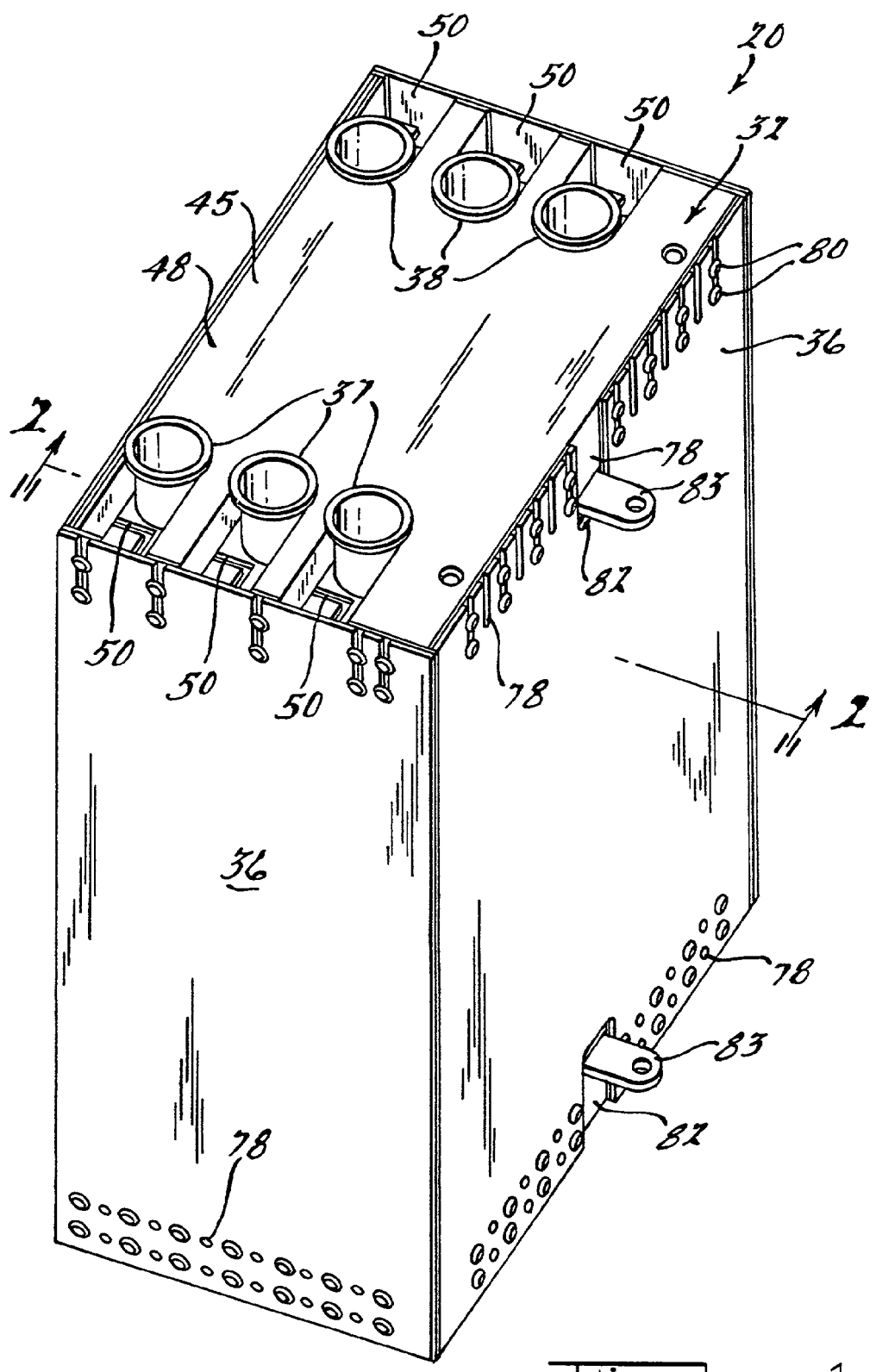
FIG. 1 is a perspective view of an electro-chemical fuel cell stack of the present invention.

Referring to FIGS. 1 and 2, there is shown an electro-chemical fuel cell stack 20 in accordance with a preferred embodiment of the present invention. The fuel cell stack 20 includes a plurality of fuel cells 22 arranged in a stacked configuration to form a fuel cell assembly 24 having opposite upper and lower ends 26, 28 with a compressed length 30 and an uncompressed length 31, is shown in FIG. 10A, therebetween. The fuel cell assembly 24 is interposed between upper and lower end assemblies 32, 34. The upper and lower end assemblies 32, 34 are held in a fixed spaced relation by a side wall. In the presently preferred embodiment, the side wall includes at least one side plate 36. The side plates 36 hold the upper and lower end assemblies 32, 34 in a spaced relation so that the upper and lower end assemblies 32, 34 impart a compressive force on the fuel cell assembly 24. The fuel cell stack 20, in accordance with known fuel stack technology, includes inlets 37, outlets 38, and passageways (not shown) for supplying and exhausting reactant and coolant fluid streams to/from the fuel cell assembly 24.

The fuel cell assembly 24, as can be seen in FIG. 4, includes multiple repeating units or fuel cells 22 having an MEA 40 and a pair of bipolar plate assemblies 42 disposed on opposite sides of the MEA 40. Each bipolar plate assembly 42 consists of a coolant distribution layer $42c$ interposed between two gas distribution layers $42g$. Interposed between the coolant distribution layer 42c and gas distribution layer 42g is an impermeable separator plate 44 which contains the coolant and separates the anode and cathode gas streams. A fuel cell 22 is formed when an MEA 40 is interposed between an anode gas distribution layer 42ga of one cell and the cathode gas distribution layer 42gc of the adjacent cell. The MEA 40 can take a variety of forms, as is known in the art. For example, the MEA 40 can be a polymer electrolyte membrane. Preferably, the polymer electrolyte membrane is a thin reinforced membrane having a thickness on the order of approximately 0.018 microns. The thin reinforced polymer electrolyte membrane is much thinner than the polymer electrolyte membrane used in prior art fuel cells that had a thickness of approximately 0.007 inches. The thin and reinforced polymer electrolyte membrane used in the present invention represents a smaller percentage of the length 30 of the fuel cell assembly 24 and exhibits significantly less slip or stress relaxation than the thicker polymer electrolyte membrane used in the prior art fuel cell stacks.

The fuel cells 22 are arranged in a stacked configuration to form the fuel cell assembly 24. The number of fuel cells 22 that are stacked adjacent one another to form the fuel cell assembly 24 can vary. The number of fuel cells 22 that are utilized to form the fuel cell assembly 24 is dependent upon the needs of the fuel cell stack 20. That is, when a larger or more powerful fuel cell stack 20 is desired, the number of fuel cells 22 in the fuel cell assembly 24 will be increased. As is known in the art, the fuel cells 22 need to be compressed so that the fuel cells 22 are more efficient and generate more power. Therefore, the fuel cell assembly 24 is compressed between the upper and lower end assemblies 32, 34. Preferably, the active area (not shown) of the fuel cell assembly 24 is uniformly compressed to maximize the efficiency of the fuel cell assembly 24 and each of the fuel cells 22 within the fuel cell assembly 24.

With reference again to FIGS. 2 and 3, the upper end assembly 32 is positioned adjacent the upper end 26 of the fuel cell assembly 24. The upper end assembly 32 includes an upper end plate 45 having opposite inner and outer surfaces 46, 48. The inner surface 46 of the upper end plates 45 faces the upper end 26 of the fuel cell assembly 24. The upper end plate 45 has numerous openings 50 that allow the various inlets 37 and outlets 38 connected to the fluid passageways to extend from the fuel cell assembly 24 to an exterior of the fuel cell stack 20. The end of the fuel cell stack 20 having the inlets 37 and outlets 38 that connect to the passageways is also referred to as the "wet end".

The lower end assembly 34 is positioned adjacent the lower end 28 of the fuel cell assembly 24. The lower end assembly 34 includes a lower end plate 58 having opposite inner and outer surfaces 60, 62. The lower end plate 58 is oriented so that the inner surface 60 of the lower end plate 58 faces the lower end 28 of the fuel cell assembly 24. When there are no inlets and outlets going through the lower end assembly 34 that connect to the fluid passageways, the lower end 28 of the fuel cell stack 20 is also known as the "dry end".

Optionally, but preferably, one or more spacer plates 52 may be located between the fuel cell assembly 24 and the upper and/or lower end plates 45, 58. The spacer plate 52 is positioned between the end plate 45, 58 and the end 26, 28 of the fuel cell assembly 24 with the inner surface 54 of the spacer plate 52 facing the end 26, 28 of the fuel cell assembly 24 and the outer surface 55 of the spacer plate 52 facing the inner surface 54, 60 of the end plate 45, 58. When a terminal plate 56 is positioned on the end 26, 28 of the fuel cell assembly 24, the spacer plate 52 is positioned between the terminal plate 56 and the end plate 45, 58 with the inner surface 54 of the spacer plate 52 facing the terminal plate 56. The spacer plate 52 separates the end plate 45, 58 from the terminal plate 56. The spacer plates 52 are oriented in the end assemblies 32, 34 so that the thickness 57 of the spacer plate 52 is aligned with the length 30 of the fuel cell assembly 24. While the preferred embodiment illustrates a spacer plate 52 associated with the upper and lower end assemblies 32, 34, a skilled practitioner will recognize that the number and location of the spacer plate 52 may vary depending on the design and application of the fuel cell stack 20.

The upper and lower end plates 45, 58 each have a peripheral side wall 64 that separates the inner surfaces 46, 60 from the outer surfaces 48, 62. The peripheral side wall 64 on the upper and lower end plates 45, 58 are aligned with the length 30 of the fuel cell assembly 24. Preferably, as shown in the figures, the fuel cell stack 20 is generally rectangular in shape and the upper and lower end plates 45, 58 are also rectangular in shape. The peripheral side wall 64 of the rectangular shaped upper and lower end plates 45, 58 is comprised of first and second pairs of opposite side walls 66, 68 that are generally perpendicular to one another. The first and second pairs of opposite side walls 66, 68 each have one or more threaded bores 70 which receive threaded fasteners 80 for securing the side plates 36 to the upper and lower end plates 45, 58.

As was mentioned above, the upper and lower end assemblies 32, 34 impart a compressive force on the fuel cell assembly 24. The compressive force imparted on the fuel cell assembly 24 is generated by the upper and lower end plates 45, 58 being held in a fixed spaced relation. Preferably, the upper and lower end plates 45, 58 are held in a fixed spaced relation by the side plates 36. Each side plate 36 has opposite first and second ends 72, 74 and a length 76 therebetween. Each side plate 36 is oriented on the fuel cell stack 20 so that the first end 72 is adjacent the upper end plate 45 and the second end 74 is adjacent the lower end plate 58 with the length 76 of the side plate 36 aligned with the length 30 of the fuel cell assembly 24. Optionally, but preferably, the side plates 36 extend along the entire peripheral side walls 64 of the end plates 45, 58. The first and second ends 72, 74 of each side plate 36 have one more openings 78 that align with the threaded bores 70 in the peripheral side walls 64 of the upper and lower end plates 45, 58 when the fuel cell assembly 24 is compressed. Preferably, the openings 78 in either the first and/or second ends 72, 74 of each side plate 36 are in the form of a slot so that the upper and lower end plates 45, 58 can be held in a fixed spaced relation. The slots allow for variations in the size of the various components of the fuel cell stack 20 while still being capable of holding the upper and lower end plates 45, 58 in a fixed spaced relation. While threaded mechanical fasteners 80 are preferably used to attach the side plates 36 to the upper and lower end plates 45, 58, a skilled practitioner will recognize that other means of attaching the side plate 36 to the upper and lower end plates 45, 58 can be employed without departing from the scope of the invention as defined by the claims. In this regard, the joint formed by the side plates 36 and the end plates 45, 58 should be sufficient to resist relative rotation at the interface therebetween. For example, the first and/or second ends 72, 74 of the side plates 36 can be secured to the respective upper and/or lower end plates 45, 58 through other mechanical fastening means such as rivets or pins, or through various bonding means such as welding, brazing or adhesive bonding and still be within the spirit of the invention. Furthermore, it should be understood that one of the ends 72, 74 of the side plates 36 can be bent to form a retaining element (not shown) that can be positioned on one of the end plates 45, 48 to retain the end plate 45, 48 while the opposite end 72, 74 of the side plates 36 are attached to an opposite end plate 45, 48 and hold the end plates in a fixed spaced relation.

Each side plate 36, as needed, can have one or more openings 82 that allow a terminal block 83 on the terminal plate 56 to extend to an exterior of the fuel cell stack 20. Preferably, each side plate 36 is electrically grounded and protects the fuel cell assembly 24 against electro-magnetic interference. Also preferably, each side plate 36 is made of metal. The side plates 36 that are used to hold the upper and lower end plates 45, 58 in a fixed spaced relation are dimensioned to maintain the upper and lower end plates 45, 58 in the fixed spaced relation while the upper and lower end plates 45, 58 impart and maintain a compressive force on the fuel cell assembly 24. Because the width of the side plate 36 is relatively large, a relatively small thickness is required to provide the necessary tensile strength for carrying the compressive load. This aspect of the invention represents a weight-savings over the conventional use of axial rods around and/or through the fuel cell assembly.

Preferably, the one or more side plates 36 enclose at least a portion of the fuel cell assembly 24 to provide protection for the fuel cell assembly 24 against inadvertent damage. Even more preferably, the side plates 36 enclose the entire fuel cell assembly 24 and provide a protective cover for the fuel cell assembly 24 and the fuel cell stack 20. Accordingly, the side plates 36 are dimensioned so that the side plates 36 can withstand impacts, blows and other assaults of various natures while protecting the fuel cell assembly 24 and the fuel cell stack 20 from damage as a result of the impact, blow or other assaults. In this manner, the side plates 36 not only act to retain the upper and lower end plates 45, 58 in a fixed spaced relation that imparts and maintains a compressive load on the fuel cell assembly 24, but also provides a protective enclosure for the fuel cell assembly 24 and the fuel cell stack 20. The use of side plates 36 to perform the protective function eliminates the need of having an additional structure placed around the fuel cell stack 20 to provide protection from inadvertent blows, impacts or other assaults on the fuel cell stack 20, as is done in conventional fuel cell stacks.

The spacer plates 52 that are optionally included in the upper end assembly 32 and/or the lower end assembly 34, serve a variety of purposes. That is, the spacer plates 52 can be included in the fuel cell stack 20 for one or more reasons. For example, the spacer plates 52 can be used to separate the upper and/or lower end plates 45, 58 from the terminal plates 56. The terminal plates 56, as mentioned above, are electrically conductive and used to extract current flow from the fuel cell stack 20 through terminal block 83. When the upper and/or lower end plate 45, 58 is electrically conductive, the spacer plate 52 positioned between the upper and/or lower end plates 45, 58 and the terminal plates 56 can electrically insulate the upper end and/or lower end plate 45, 58 from the terminal plates 56. The spacer plates 52 can also be used to control the overall dimensions of the fuel cell stack 20. That is, one or more spacer plates 52 can be positioned between the fuel cell assembly 24 and the upper and/or lower end plates 45, 58 to provide a fuel cell stack 20 having a predetermined length while the end assemblies 32, 34 still impart a compressive force on the fuel cell assembly 24, as will be discussed in more detail below. As presently preferred, the spacer plate(s) 52 have a thickness 57 in the range of about 8–18 millimeters to provide adequate electrical insulation and uniform dimension of the fuel cell stack 20. However, one skilled in the art will recognize that the particular application and design specification will dictate the ranges of thickness 57 for the spacer plate(s) 52. The spacer plates 52 can also be used in combination with the upper and/or lower end plates 45, 58 for imparting a generally uniform compressive load on the fuel cell assembly 24, as will be discussed in more detail below.

Preferably, the spacer plates 52 are non-conductive and can serve to electrically insulate various components of the fuel cell stack 20. Therefore, the spacer plates 52 are preferably made from a non-conductive material such as plastic. Even more preferably, the spacer plates 52 are made from an engineering grade high performance plastic. The engineering grade high performance plastic used to make the one or more spacer plates 52 is relatively noncompressible (i.e., insignificant stress relaxation) under the magnitude of compressive loading applied to the fuel cell assembly 24 so as to transfer the compressive load from the upper and/or lower end plates 45, 58 to the respective upper and lower ends 26, 28 of the fuel cell assembly 24. In particular, polythenylene sulfide has proven to be an especially effective material from which to make spacer plates 52. Polythenylene sulfide is available under the RYTON PPS brand sold by Chevron Phillips Chemical Company, L.P. and under the FORTRON brand sold by Celanese AG, of Frankfurt, Germany. Preferably, as can be seen in FIG. 7, the spacer plates 52 have one or more apertures 84 that reduce the weight of the spacer plates 52.

As was mentioned above, the upper and lower end plates 45, 58 are held in a fixed spaced relation by the side plates 36 and impart a compressive load on the fuel cell assembly 24. As previously described, the upper and lower end plates 45, 58 are retained in the fixed spaced relation by the side plates 36. The compressive loading generated in the upper and lower ends 26, 28 of the fuel cell assembly 24 will vary depending on the distance from the peripheral side walls 64 with the compressive loading being at a maximum along the peripheral side walls 64 and at a minimum in a center of the upper and lower end plates 45, 58. That is, because the upper and lower end plates 45, 58 are only retained along their peripheral side walls 64, the upper and lower end plates 45, 58 will deform or deflect in response to the compressive loading on the fuel cell assembly 24 and the inability of the peripheral side walls 64 of the upper and lower end plates 45, 58 to move further apart. Because the efficiency of the fuel cell stack 20 is partially dependent upon a uniform compressive load being applied across the active area of the fuel cell assembly 24, it is desirable to maintain a generally uniform compressive load over the entire active area of the fuel cell assembly 24.

One means for obtaining a generally uniform load is to make the upper and lower end plates 45, 58 rigid by increasing the thickness thereof so that the deflection that occurs in the upper and lower end plates 45, 58 has a deminimus effect on the efficiency of the fuel cell assembly 24. However, providing this thickness can make for upper and lower end plates 45, 58 that are excessively thick and add excess weight to the fuel cell stack 20 thereby decreasing the gravimetric and volumetric efficiency of the fuel cell stack. To avoid the necessity of providing end plates 45, 58 that are relatively rigid, the end plates 45, 58 can optionally be attached to the spacer plates 52 and to the terminal plates 56 so that the stiffness of the spacer plates 52 and the stiffness of the terminal plates 56 contribute to the overall stiffness of the end assemblies 32, 34 and reduces the thickness of the end plates 45, 58 required to apply a generally uniform compressive load across the active area of the fuel cell assembly 24. That is, as can be seen in FIGS. 7A–B, the terminal plate 56, the spacer plates 52 and the end plates 45, 58 can be fastened together to combine their stiffnesses and form end assemblies 32, 34 that can impart a generally uniform compressive load on the active area of the fuel cell assembly 24. As can be seen in FIG. 7A, the terminal plate 56 can be connected to the spacer plate 52 by means of a mechanical fastener 86, such as a threaded bolt or screw, and the combined terminal plate 56 and spacer plate 52 can then be attached to one of the end plates 45, 58 via mechanical fasteners 87. Alternatively, the terminal plate 56, the spacer plates 52, and one of the end plates 45, 58 can all be attached by means of adhesive layers 88 interposed between the respective components. The stiffness of the terminal plate 56 and the stiffness of the spacer plates 52 thereby combine with the stiffness of the end plates 45, 58 to provide end assemblies 32, 34 that can apply a generally uniform compressive load to the active area of the fuel cell assembly 24 with thinner end plates 45, 58 then would be necessary without the attachment of the terminal plate 56 or spacer plates 52 to the end plates 45, 58.

Alternatively, and/or additionally, the end plates 45, 58 and/or the spacer plates 52 can have shaped surfaces that compensate for the deflection of the end plates 45, 58 and impart a generally uniform compressive load across the active area of the fuel cell assembly 24 without requiring the use of excessively thick end plates 45, 58. That is, as can be seen in FIGS. 5A–G, which only show the upper end plate 45 and a single spacer plate 52, the inner surface 46 of the upper end plate 45 can be dimensioned to curve away from the upper end plate 45 and toward the upper end 26 of the fuel cell assembly 24 so that the upper end plate 45 has a thickness that is a minimum along a peripheral side wall 64 and is at a maximum in a center of the upper end plate 45. The shape of the inner surface 46 of the upper end plate 45 is contoured to account for the deflection that will occur in the upper end plate 45 as a result of the upper end plate 45 being retained along its peripheral side wall 64 in a fixed spaced relation from a lower end plate 58, while imparting a compressive load of a desired magnitude on the active area of the fuel cell assembly 24. FIGS. 6A–C show an exemplary contouring of the inner surface 46 of the upper end plate 45. As can be seen, the upper end plate 45 has a maximum thickness in the approximate center of the upper end plate 45.

Alternatively, and/or additionally, the spacer plate 52 can have the inner and/or outer surfaces 54, 55 contoured to account for the deflection that will occur in the upper end plate 45. That is, the spacer plate 52 can be configured to have a thickness that is at a minimum along a periphery of the spacer plate 52 and at a maximum in the center of the spacer plate 52. For example, as shown in FIG. 5G, the inner surface 54 of the spacer plate 52 can be contoured to extend from the spacer plate 52 toward the upper end 26 of the fuel cell assembly 24, or, as can be seen in FIG. 5E, the outer surface 55 of the spacer plate 52 can be contoured to extend from the spacer plate 52 toward the upper end plate 45 so that a generally uniform compressive load can be imparted on the active area of the fuel cell assembly 24 by the end plate 45. Alternatively, as can be seen in FIG. 5F, both the inner and outer surfaces 54, 55 of the spacer plate 52 can be contoured to extend from the spacer plate 52 toward the respective upper end 26 of the fuel cell assembly 24 and the inner surface 46 of the upper end plate 45 so that a generally uniform compressive load can be imparted on the active area of the fuel cell assembly 24.

Various permutations on the shaping of the inner and outer surfaces 54, 55 of the spacer plate 52 and of the inner surface 46 of the upper end plate 45 are shown in FIGS. 5A–G. The contoured shape of the surfaces of the upper end plate 45 and/or the spacer plate 52 can be dimensioned to not only account for the deflection of the upper end plate 45 but also for the deflection of the lower end plate 58 so that both the upper and lower ends 26, 28 of the fuel cell assembly 24 receive a generally uniform compressive loading. Likewise, it should be understood that the inner surface 60 of the lower end plate 58 and the inner and outer surfaces 54, 55 of a spacer plate 52 in the lower end assembly 34 can also be contoured or shaped in the same manner so that the components of the lower end assembly 34 impart a generally uniform compressive load on the active area of the fuel cell assembly 24. A skilled practitioner will recognize that the inner surface 46 may have various localized features formed therein for obtaining a more uniform compressive loading over the active area of the fuel cell assembly 24. Therefore, it should be understood that the components of the upper end assembly 32 and/or the components of the lower end assembly 34 can have their surfaces contoured and shaped, either singularly or simultaneously, to apply a generally uniform compressive load on the active area of the fuel cell assembly 24. It should further be understood that the dimensions shown in the various figures are exaggerated for exemplary purposes and should not be taken as being sized relative to each component of the fuel cell stack 20. That is, it should be understood that the deflection of the end plates 45, 58 and the correction by shaping the surfaces of the end plates 46, 58 and/or the spacer plates 52 are exaggerated to better exemplify the principles of the invention. It should also be understood that use of the terms upper and lower to describe the various components of the fuel cell stack 20 are not be construed as being an absolute reference, but rather are to be construed as providing a relative relationship of the components of the fuel cell stack 20.

While the fuel cell stack 20 is described and illustrated as being generally a rectangular shaped configuration, it should be understood that the shape of the fuel cell stack 20 may take a variety of configurations and still be within the scope of the invention as defined by the claims. For example, the fuel cell stack 20 can be cylindrical and the fuel cell assembly 24 along with the upper and lower end assemblies 32, 34 would also be cylindrical. When the fuel cell stack 20 is cylindrical, the side plate 36 can be a single cylindrical sleeve within which the upper and lower end assemblies 32, 34 and the fuel assembly 24 are inserted. The side plates 36 could also be portions of a cylindrical sleeve and enclose the components of the fuel cell stack 20. Therefore, the use of the term side plate should not be limited to a flat plate but rather should be construed as being a plate that can be flat or curved or take a variety of shapes as dictated by the particular shape of the fuel cell stack 20.

Figures 9A, 9B:
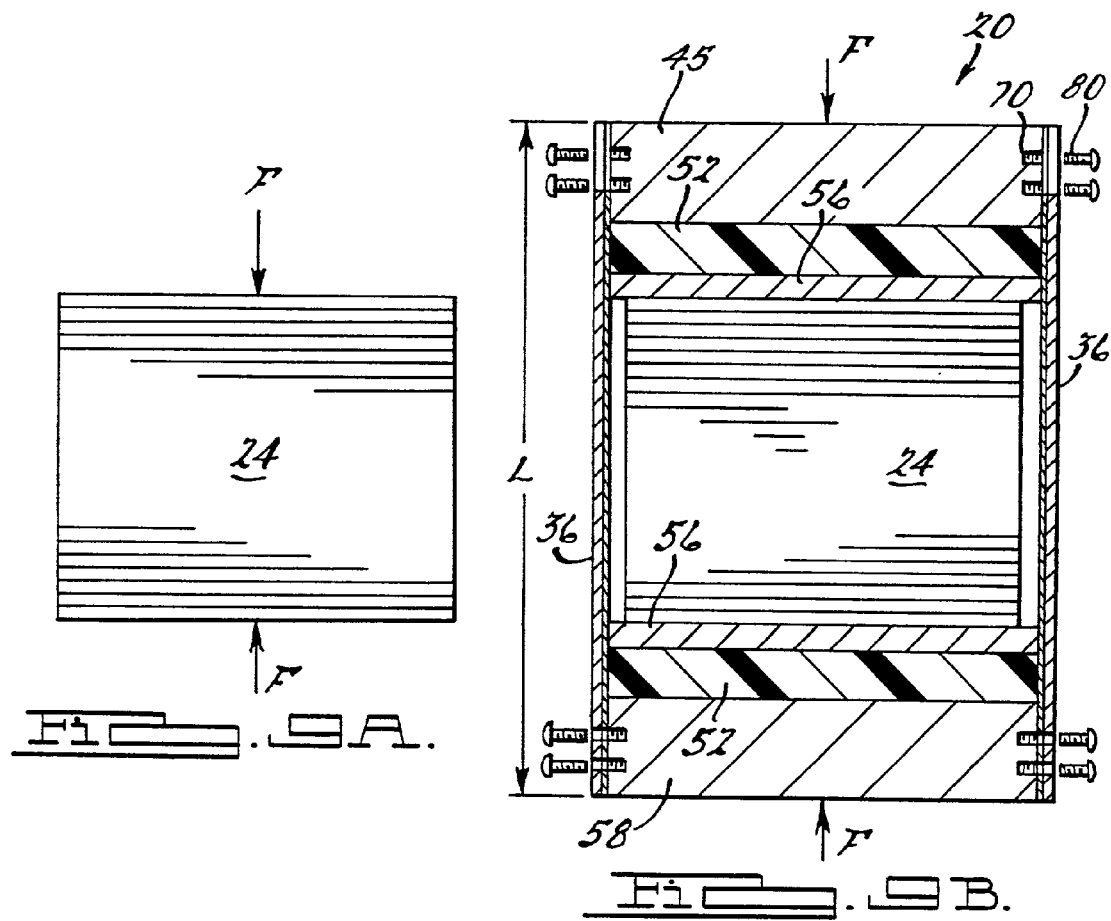
FIGS. 9A–B are simplified cross-sectional views of the electro-chemical fuel cell stack of FIG. 1 illustrating the respective compressing of the fuel cell assembly and fuel cell stack with a compressive force of a predetermined magnitude F.
Figure 11:
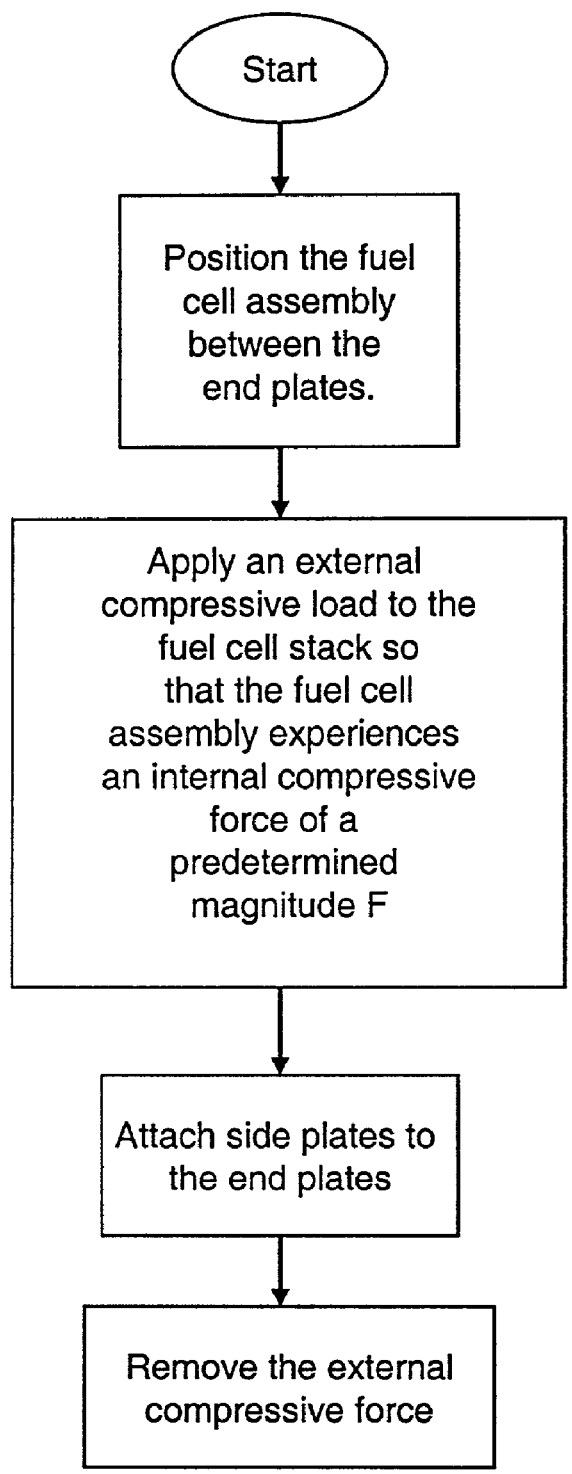
FIG. 11 is flow chart showing the steps of the Predetermined Force Compression Method of making a fuel cell stack according to the principles of the present invention.

As was stated earlier, the fuel cell stack 20 has a fuel cell assembly 24 that is maintained with a compressive loading so that the fuel cell assembly 24 is more efficient. The present invention further includes various methods of making a fuel cell stack 20 having a fuel cell assembly 24 under a compressive loading. In a first method, the Predetermined Compressive Load Method, as can be seen in FIGS. 9A–B and 11, the fuel cell assembly 24 and/or the fuel cell stack 20 is compressed with an external compressive load which generates an internal compressive load of a predetermined magnitude F on the fuel cell assembly 24. The side plates 36 are then secured to the upper and lower end plates 45, 58 to maintain the upper and lower end plates 45, 58 in a fixed spaced relation when the external compressive loading is removed from the fuel cell assembly 24 and/or fuel cell stack 20. Because the upper and lower end plates 45, 58 are maintained in a fixed spaced relation after the external compressive loading is removed, an internal compressive loading remains imparted on the fuel cell assembly 24 by the upper and lower end plates 45, 58, as will be discussed in more detail below.

Figure 12:
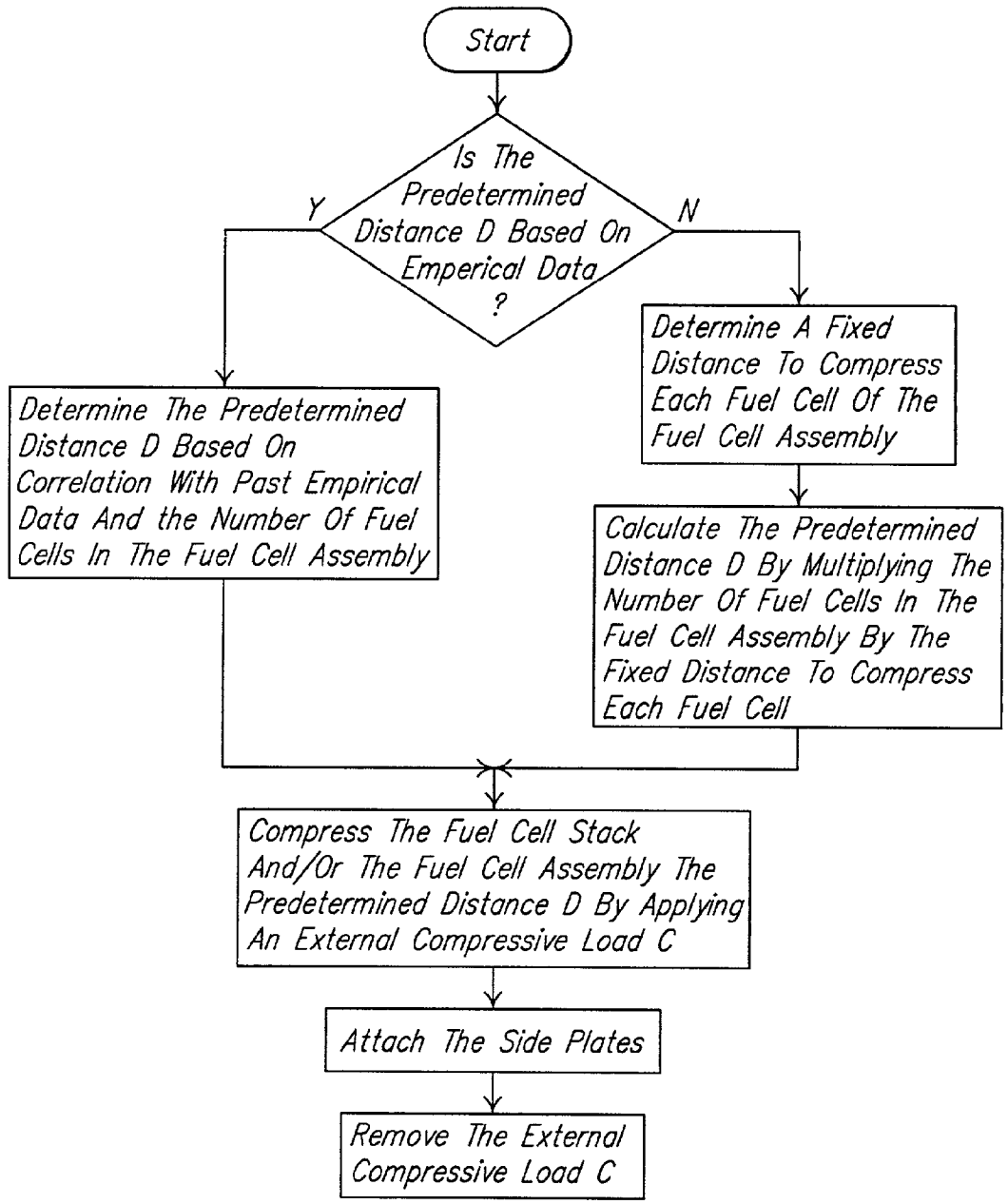
FIG. 12 is a flow chart showing the steps of the Predetermined Compressive Distance Method of making a fuel cell stack according to the principles of the present invention.

In a second method, the Predetermined Compressive Distance Method, as can be seen in FIGS. 10A–B and 12, the fuel cell assembly 24 and/or the fuel cell stack 20 is compressed a predetermined distance D by an external compressive load C. In other words, the magnitude of the external compressive load is sufficient to compress the fuel cell assembly 24 a predetermined distance D. The side plates 36 are then attached to the upper and lower end plates 45, 58 (as will be described in more detail below). The external compressive load is then removed. The upper and lower end plates 45, 58 remain in their fixed spaced relation. The fuel cell assembly 24 remains compressed generally the predetermined distance D to impart an internal compressive loading thereon.

As was stated above, the Predetermined Compressive Load Method of making a fuel cell stack 20 having a fuel cell assembly 24 under a compressive loading of a predetermined magnitude F involves applying an external compressive load to the fuel cell stack 20. The Predetermined Compressive Load Method includes the steps of: 1) positioning the fuel cell assembly 24 between the upper and lower end plates 45, 58 with the upper end 26 of the fuel cell assembly 24 adjacent the upper end plate 45 and the lower end 28 of the fuel cell assembly 24 adjacent the lower end plate 58; 2) applying an external compressive force to at least one of the end plates 45, 58 so that the fuel cell assembly 24 is compressed and experiences an internal compressive force of a predetermined magnitude F; 3) attaching the side plates 36 to the end plates 45, 58 with the first and second ends 72, 74 of the side plates 36 being attached to the respective upper and lower end plates 45, 58; and 4) removing the external compressive force being applied to at least one of the end plates 45, 58, whereby the upper and lower end plates 45, 58 remain in a fixed spaced relation to maintain a compressive force generally equal to the predetermined magnitude F on the fuel cell assembly 24. The Predetermined Compressive Load Method thereby provides a fuel cell stack 20 that has a compressive force generally equal to the predetermined magnitude F imparted on the fuel cell assembly 24.

In contrast, when the Predetermined Compressive Distance Method is used to assemble a fuel cell stack 20, the fuel cell stack 20 and/or the fuel cell assembly 24 are compressed a predetermined distance D as opposed to being compressed with a compressive force of a predetermined magnitude F. The reference point for the predetermined distance D could be an overall length of the fuel cell assembly 24 itself. Therefore, further reference will only be made to compressing the fuel cell assembly 24 the predetermined distance D and not to compressing the fuel cell stack 20. However, it should be understood that the compressing of the fuel cell assembly 24 the predetermined distance D could also be done by compressing the fuel cell stack 20 the predetermined distance D. Preferably, the predetermined distance D corresponds to applying a compressive force to the fuel cell assembly 24 that results in efficient operation of the fuel cell stack 20. The predetermined distance D to compress the fuel cell assembly 24 can be determined in a variety of ways. For example, the predetermined distance D can be computationally based upon a fixed distance compression for each fuel cell 22 that comprises the fuel cell assembly 24 or can be based upon empirical data from past experience with compressing fuel cell assemblies 24 having a known number of fuel cells 22, as will be discussed in more detail below. Once the predetermined distance D has been determined, an external compressive load is applied to the fuel cell stack 20 so that the fuel cell stack 20 and/or fuel cell assembly 24 is compressed the predetermined distance D. The side plates 36 are then attached to the upper and lower end plates 45, 58 and the external compressive load is removed. The resulting fuel cell stack 20 has a fuel cell assembly 24 that is compressed the predetermined distance D and has an internal compressive loading that corresponds to efficient operation of the fuel cell stack 20.

When the predetermined distance D is computationally based (i.e., based upon a fixed distance compression for each fuel cell), each fuel cell 22 is compressed a given distance. The predetermined distance D to compress the fuel cell assembly 24 is calculated by multiplying the number of fuel cells 22 n that are in the fuel cell assembly 24 by the fixed distance d that each fuel cell 22 is to be compressed. In other words, by the equation $D=n \times d$. The fixed distance to compress each fuel cell 22 is chosen to provide a compressive force on the fuel cell 22 that has a magnitude that generally corresponds to providing efficient operation of the fuel cell assembly 24. That is, the fixed distance d that each fuel cell 22 is to be compressed is based upon the physical properties of the fuel cells 22 and the amount of compression required for the fuel cells 22 to operate efficiently. The resulting fuel cell stack 20 has a fuel cell assembly 24 that is compressed the predetermined distance D and has a compressive loading that corresponds to efficient operation of the fuel cell assembly 24.

When based on empirical data, the predetermined distance D to compress the fuel cell assembly 24 is determined from past experiences with compressing fuel cell assemblies 24 by a known compressive load as opposed to compressing each fuel cell 22 a fixed distance. The resulting predetermined distance D may be the same for both methods. Because of general uniformity in the composition of the fuel cells 22 that comprise a fuel cell assembly 24, a general correlation can be established, for each type of fuel cell 22, between the number of fuel cells 22 and the compressed distance of the fuel cell assembly 24 and/or fuel cell stack 20 that occurs when the fuel cell assembly 24 is subject to a compressive force of a known magnitude. The correlation can be used to determine, based upon the number of fuel cells 22 that comprise the fuel cell assembly 24, the predetermined distance D to compress the fuel cell assembly 24 to impart a compressive force of a desired magnitude on the fuel cell assembly 24. For example, empirical data shows that fuel cell assemblies having fifty and two hundred fuel cells are compressed a distance of X and 4X, respectively, imparts a compressive force of the desired magnitude. A fuel cell stack 20 having a fuel cell assembly 24 that is comprised of one hundred similar fuel cells 22 would be compressed a distance of 2X and based on the correlation should impart a compressive force of generally the same desired magnitude on the fuel cell assembly 24.

Because there is some variability in the composition of any given type of fuel 22, the resulting compressive force imparted on the fuel cell assembly 24 may vary. The amount of variation in the resulting compressive force will depend on the accuracy of the correlations and the variability of the fuel cells 22. Preferably, the resulting compressive force will vary within an acceptable range around the desired magnitude such that the variation has a negligible effect on the efficiency of the fuel cell stack 20. The empirical data method thereby provides a fuel cell stack 20 having a fuel cell assembly 24 that is subjected to a compressive force generally equal to a desired magnitude, that corresponds to efficient operation of the fuel cell assembly 24, when the fuel cell assembly 24 is compressed the predetermined distance D.

As was mentioned above, spacer plates 52 can be used to provide a fuel cell stack 20 of a predetermined or uniform length L. That is, spacer plates 52 can be used in the fuel cell stack 20 to occupy space so that the fuel cell stack 20 is a predetermined or uniform length L. A uniform length L provides many advantages. For example, a uniform length L allows for fuel cell stacks to be easily interchanged and also allows apparatuses in which the fuel cell stack 20 is utilized to have standardized spaces for the fuel cell stack 20.

Figure 13A:
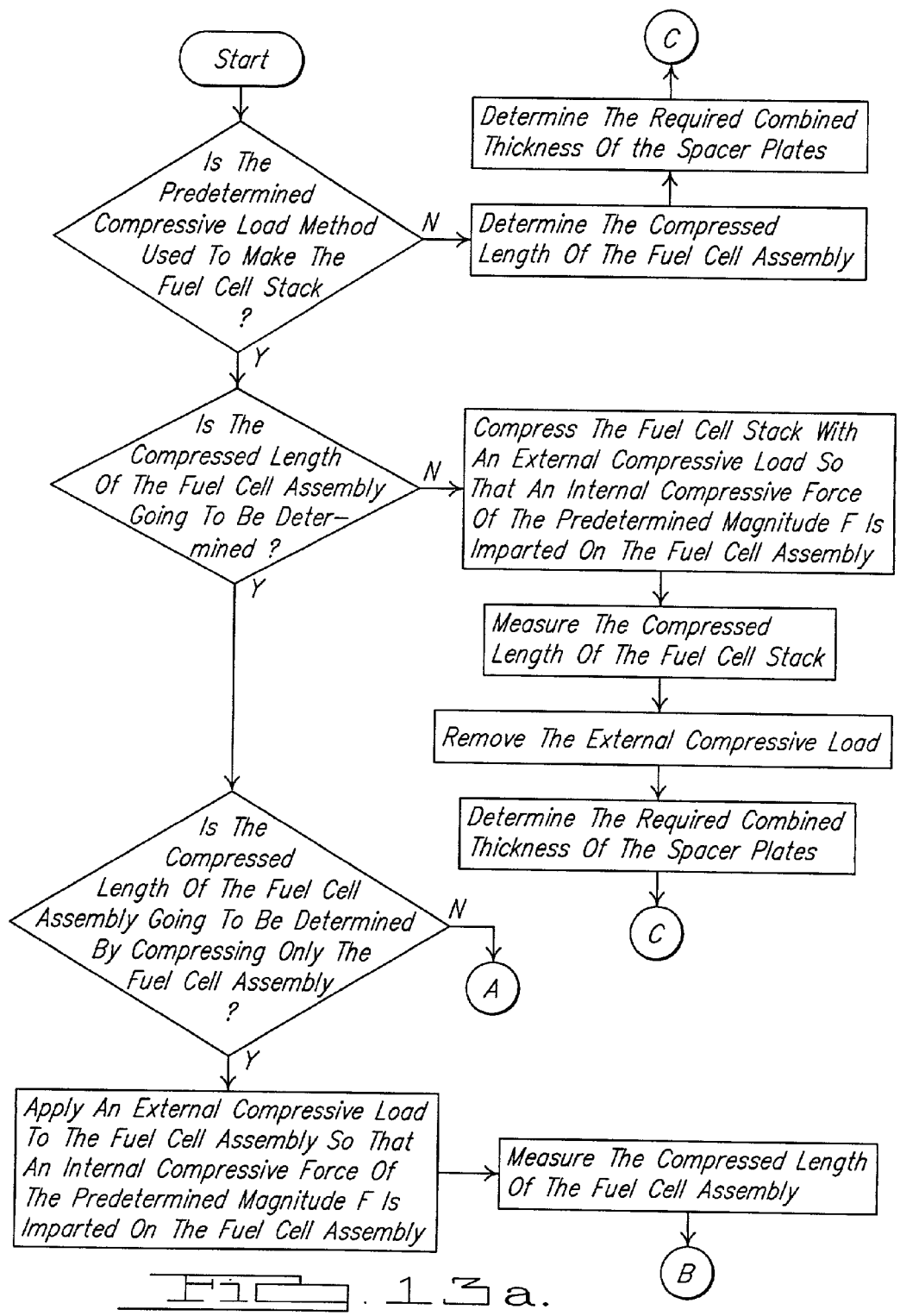
FIG. 13 is a flow chart showing the steps of using spacer plates to make a fuel cell stack of a predetermined or uniform length.
Figure 13B:
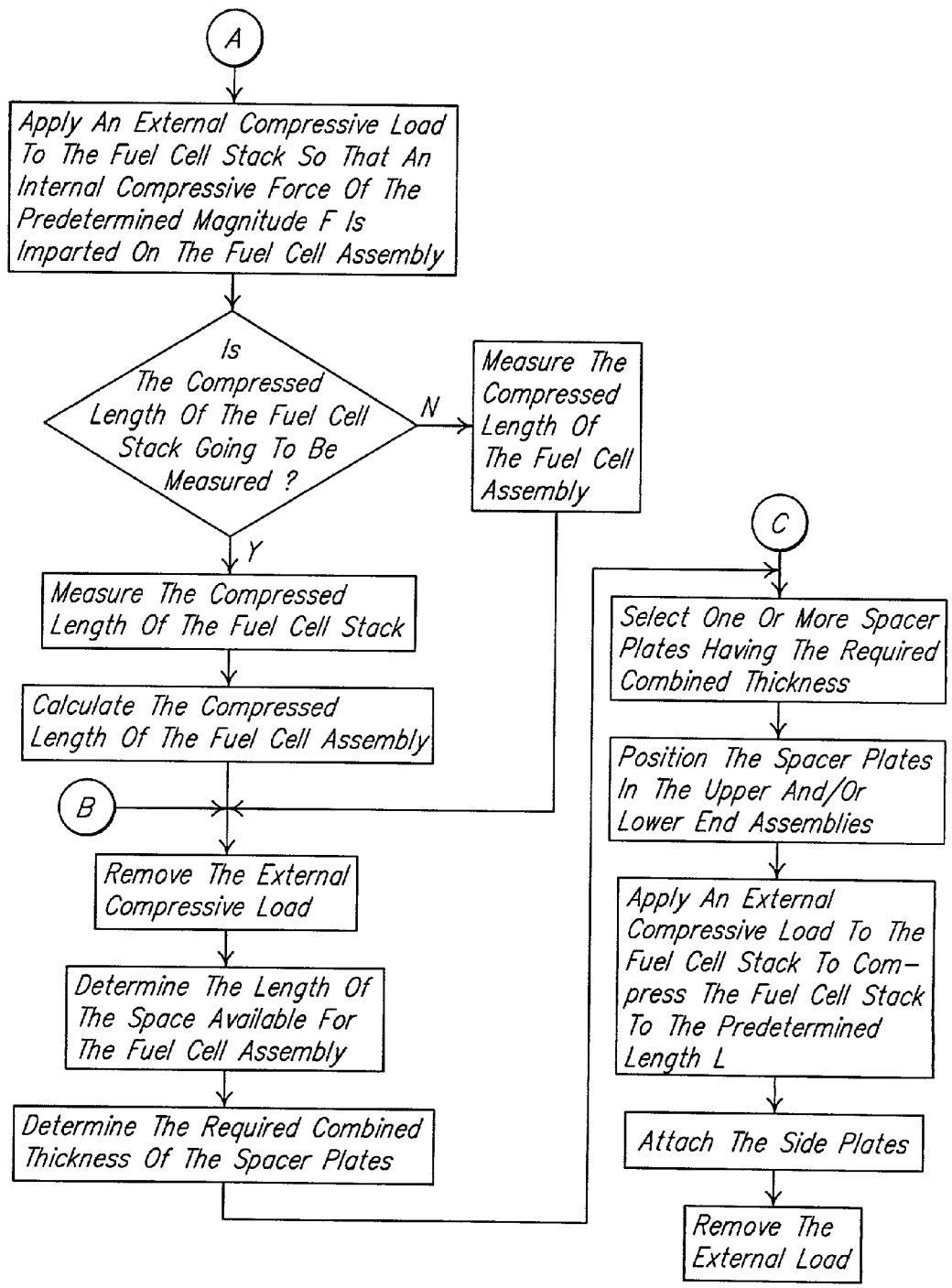

The present invention provides various assembly sequences for a fuel cell stack having a uniform length L as shown in FIGS. 13a–13b. The desired predetermined or uniform length L of the fuel cell stack 20 can be either a known length, such as an industry standard, or a chosen length. In either case, the overall length L is a known quantity. The thicknesses of the upper and lower end plates 45, 58, any terminal plates 56 that are used in the fuel cell stack 20, and any other components of the end assemblies 32, 34 can be measured and thus are also known quantities. Based on these known quantities/dimensions, the space within the fuel cell stack 20 in which the fuel cell assembly 24 is to be placed can be calculated and is therefore also a known quantity. That is, the length of the space within the fuel cell stack 20 in which the fuel cell assembly 24 is to be placed is equal to the predetermined or uniform length L of the fuel cell stack 20 minus the dimensions of the end plates 45, 58, any terminal plates 56 and any other components that make up the end assemblies 32, 34. The only unknown dimension is the compressed length 30 of the fuel cell assembly 24. The compressed length 30 of the fuel cell assembly 24 can vary depending upon which method, as discussed above, is used to make the fuel cell stack 20 and the number of fuel cells 22 that comprise the fuel cell assembly 24.

As was stated above, spacer plates 52 can be used with the Predetermined Compressive Load Method to make a fuel cell stack 20 of a predetermined or uniform length L with the fuel cell assembly 24 being imparted a compressive loading generally equal to the predetermined magnitude F. To do this, either the compressed length 30 of the fuel cell assembly 24 or the compressed length of the fuel cell stack 20 needs to be determined so that the required combined thicknesses of the one or more spacer plates 52 can be ascertained.

The compressed length 30 of the fuel cell assembly 24 can be determined either by (1) compressing the fuel cell assembly 24 with an external compressive load such that an internal compressive load of the predetermined magnitude F is obtained and measuring the compressed length 30, as can be seen in FIG. 9A; or by (2) compressing the fuel cell stack 20 with an external load so that an internal compressive load of predetermined magnitude F is imparted on the fuel cell assembly 24, as can be seen in FIG. 9B, and either (A) measuring the compressed length 30 of the fuel cell assembly 24; or (B) measuring the compressed length of the fuel cell stack 20 and calculating the compressed length 30 of the fuel cell assembly 24 by subtracting the known dimensions of the end plates 45, 58, the terminal plates 56 and any other components of the end assemblies 32, 34. Once the compressed length 30 of the fuel cell assembly 24 has been determined, the external compressive load can be removed from the fuel cell assembly 24 or fuel cell stack 20. The compressed length 30 of the fuel cell assembly 24 is used to calculate the required combined thickness of the spacer plates 52 to make the fuel cell stack 20 of the predetermined or uniform length L. The required combined thickness of the spacer plates 52 equals the difference between the length of the space within which the fuel cell assembly 24 is to be placed (as was discussed above) and the compressed length 30 of the fuel cell assembly 24. Therefore, the required combined thickness of the spacer plates 52 can be calculated.

Alternatively, the compressed length of the fuel cell stack 20 having an internal compressive loading on the fuel cell assembly 24 of the predetermined magnitude F can be used. The compressed length of the fuel cell stack 20 can be determined by compressing the fuel cell stack 20 with an external compressive load so that an internal compressive load of the predetermined magnitude F is imparted on the fuel cell assembly 24 and then measuring the compressed length of the fuel cell stack 20. The external compressive load on the fuel cell stack is then removed. The difference between the predetermined or uniform length L of the fuel cell stack 20 and the measured compressed length of the fuel cell stack 20 is calculated. The calculated difference is the required combined thickness of the spacer plates 52.

Once the required combined thickness of the spacer plates 52 has been determined, one or more spacer plates 52 having the required combined thickness are selected. The selected spacer plates 52 are positioned between the upper and/or lower end plates 45, 58 and the respective upper and/or lower ends 26, 28 of the fuel cell assembly 24. The spacer plates 52 are oriented so that the combined thicknesses of the spacer plates 52 are aligned with the length 30 of the fuel cell assembly 24. The fuel cell stack 20 is then compressed by applying an external compressive load to the fuel cell stack 20 so that the fuel cell stack 20 is generally at the predetermined or uniform length L. The resulting internal compressive load of the fuel cell stack 20 having the predetermined or uniform length L should generally be equal to the predetermined magnitude F. The side plates 36 are then secured to the upper and lower end plates 45, 58 so that the upper and lower end plates 45, 58 retain the fuel cell stack 20 generally at the predetermined or uniform length L. Finally, the external compressive load is removed from the fuel cell stack 20. The resulting fuel cell stack 20 has a length that is generally equal to the predetermined or uniform length L with the fuel cell assembly 24 compressed generally at the predetermined magnitude F.

The Predetermined Compressive Distance Method of making a fuel cell stack 20 can also utilize spacer plates 52 to make a fuel cell stack 20 of a predetermined or uniform length L. The required combined thickness of the spacer plates 52 is based upon the desired predetermined or uniform length L for the fuel cell stack 20, the compressed length 30 of the fuel cell assembly 24, and the thickness of the components that comprise the end assemblies 32, 34. The compressed length 30 of the fuel cell assembly 24 is calculated by subtracting the predetermined distance D from the uncompressed length 31 of the fuel cell assembly 24. The compressed length 30 of the fuel cell assembly 24 and the thicknesses of the end plates 45, 58, the terminal plates 56 and any other components that comprise the end assemblies 32, 34 are subtracted from the predetermined or uniform length L of the fuel cell stack 20 to yield the required combined thickness of the spacer plates 52. Spacer plates 52 are then selected so that the combined thickness of the spacer plates 52 are generally equal to the required overall thickness. The selected spacer plates 52 are then added to the fuel cell stack 20 as discussed above. The resulting fuel cell stack 20 generally has the desired predetermined or uniform length L, a fuel cell assembly 24 generally compressed the predetermined distance D, and an internal compressive loading that corresponds to efficient operation of the fuel cell assembly 24.

When a term is quantified with the adverb "generally" herein, it should be understood to mean that the magnitude of the factor described is within an acceptable range of tolerance to the desired magnitude.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of making an electro-chemical fuel cell stack of a predetermined length, the method comprising the steps of:
    choosing a predetermined length for a fuel cell stack having a fuel cell assembly;
    compressing said fuel cell assembly with a predetermined compressive load;
    determining a compressed length of said compressed fuel cell assembly;
    calculating a difference between a length of space available for said compressed fuel cell assembly in said fuel cell stack and said compressed length of said compressed fuel cell assembly;
    removing said predetermined compressive load from said fuel cell assembly;
    positioning at least one spacer plate having a thickness generally equal to said calculated difference in said fuel cell stack;
    applying a compressive load to said fuel cell stack so that said fuel cell stack is compressed to said predetermined length;
    securing first and second end plates of said fuel cell stack in a fixed spaced relation to retain said fuel cell stack at said predetermined length, thereby imparting a compressive force on said fuel cell assembly after said applied compressive load on said fuel cell stack is removed; and
    removing said applied compressive load from said fuel cell stack.

2. The method of claim 1, wherein the step of determining a compressed length of said compressed fuel cell assembly includes measuring said compressed length of said compressed fuel cell assembly.

3. The method of claim 1, wherein the step of compressing said fuel cell assembly includes compressing said fuel cell stack with said predetermined compressive load.

4. The method of claim 3, wherein the step of determining a compressed length of said compressed fuel cell assembly includes measuring said compressed length of said compressed fuel cell assembly.

5. The method of claim 3, wherein the step of determining a compressed length of said compressed fuel cell assembly includes measuring a length of said compressed fuel cell stack and calculating said compressed length of said fuel cell assembly.

6. The method of claim 1, wherein the step of positioning at least one spacer plate includes positioning said at least one spacer plate between a dry end of said fuel cell assembly and an end plate adjacent said dry end of said fuel cell assembly.

7. The method of claim 1, wherein the step of positioning at least one spacer plate includes positioning said at least one spacer plate between a terminal plate adjacent at least one of first and second end plates and said fuel cell assembly.

8. The method of claim 1, wherein the step of securing first and second end plates of said fuel cell stack in a fixed spaced relation includes attaching at least one side plate to said first and second end plates of said fuel cell stack.

9. A method of making an electro-chemical fuel cell stack of a predetermined length, the method comprising the steps of:
    choosing a predetermined length for a fuel cell stack having a fuel cell assembly;
    compressing said fuel cell stack with a predetermined compressive load;
    determining a compressed length of said compressed fuel cell stack;
    calculating a difference between said predetermined length and said compressed length of said compressed fuel cell stack;
    removing said predetermined compressive load from said fuel cell stack;
    positioning at least one spacer plate having a thickness generally equal to said calculated difference in said fuel cell stack;
    applying a compressive load to said fuel cell stack so that said fuel cell stack is compressed to said predetermined length;
    securing first and second end plates of said fuel cell stack in a fixed spaced relation to retain said fuel cell stack at said predetermined length, thereby imparting a compressive force on said fuel cell assembly after said applied compressive load on said fuel cell stack is removed; and
    removing said applied compressive load from said fuel cell stack.

10. The method of claim 9, wherein the step of positioning at least one spacer plate includes positioning said at least one spacer plate between a dry end of said fuel cell assembly and an end plate adjacent said dry end of said fuel cell assembly.

11. The method of claim 9, wherein the step of positioning at least one spacer plate includes positioning said at least one spacer plate between a terminal plate adjacent at least one of said first and second end plates and said fuel cell assembly.

12. The method of claim 9, wherein the step of securing first and second end plates of said fuel cell stack in a fixed spaced relation includes attaching at least one side plate to said first and second end plates of said fuel cell stack.

* * * * *